(12) United States Patent  (10) Patent No.: US 8,908,228 B2
Qian et al.  (45) Date of Patent: Dec. 9, 2014

(54) METHOD AND SYSTEM FOR CHANGING PHYSICAL PAGE PROPERTIES IN A POSTER PRINTING APPLICATION

(75) Inventors: Hui Qian, San Jose, CA (US); Kenneth Young, Foster City, CA (US)

(73) Assignee: Konica Minolta Laboratory U.S.A., Inc., San Mateo, CA (US)

(*) Notice: Subject to any disclaimer, the term of this patent is extended or adjusted under 35 U.S.C. 154(b) by 68 days.

(21) Appl. No.: 13/435,822

(22) Filed: Mar. 30, 2012

(65) Prior Publication Data

US 2013/0258361 A1    Oct. 3, 2013

(51) Int. Cl.
*G06F 15/00*    (2006.01)
(52) U.S. Cl.
USPC ............ 358/1.9; 358/2.1; 358/1.18; 382/282; 382/284; 715/202; 715/204; 715/243; 715/246; 715/251; 715/274
(58) Field of Classification Search
CPC ..... G06F 3/1208; G06F 3/125; G06F 17/212; G06F 5/01; G06K 15/1885
USPC .......... 358/1.9, 1.2, 1.6, 2.1, 1.13, 1.15, 1.18, 358/540, 538; 382/282, 284, 298; 715/202, 715/204, 243, 246, 251, 274
See application file for complete search history.

(56) References Cited

U.S. PATENT DOCUMENTS

| | | | |
|---|---|---|---|
| 5,508,718 A * | 4/1996 | Haikin | 345/601 |
| 6,556,210 B1 * | 4/2003 | Yamamoto et al. | 345/582 |
| 2005/0052662 A1 * | 3/2005 | Nishikawa et al. | 358/1.2 |
| 2009/0185209 A1 * | 7/2009 | Yudasaka et al. | 358/1.9 |

* cited by examiner

*Primary Examiner* — Jamares Q Washington
(74) *Attorney, Agent, or Firm* — Buchanan Ingersoll & Rooney PC (57) ABSTRACT

A method for changing physical page properties in a large format printing application on a client device, the client device having executable instructions for creating a print job for producing a printout of an image, which includes the steps of: selecting the image for the print job; selecting a logical page size for the printout of the image; dividing the logical page size into a plurality of physical pages based on a selected medium; and selecting at least one physical page from the plurality of physical pages and changing at least one print property on the at least one physical page.

18 Claims, 9 Drawing Sheets

METHOD AND SYSTEM FOR CHANGING PHYSICAL PAGE PROPERTIES IN A POSTER PRINTING APPLICATION

FIELD OF THE INVENTION

This invention relates to printing of large format printouts or poster printing, and in particular, it relates to a network printing system and method of creating a print job for producing a large format printout of an image, wherein the user can specify a print property for one or more individual physical pages, which is different than from other physical pages in the print job.

BACKGROUND OF THE INVENTION

Poster printing refers to large format printing where the printouts have sizes many times larger than a letter or A4 sized sheet. For example, a poster may be 24 inches by 36 inches in size. In addition, high quality printouts are desired for poster printing. Conventionally, posters are printed on large format papers and require sophisticated, large printers to print. Small printers typically used in homes or business offices, are typically limited to letter, legal, A4 and A3 sizes papers and cannot handle larger sized papers.

To enable printing of a large format poster using a small printer in an inexpensive manner, some printer drivers or application software provide a poster printing function, which divides the large poster image into smaller image sections, typically rectangular in shape. For example, a 24 inch by 36 inch poster can be divided into 2 by 3 image sections or partitions to be printed. The image sections or partitions are printed separately on individual sheets of paper, and assembled together by the user to form a large format poster.

In accordance with an exemplary embodiment, it would be desirable to allow an individual user to specify a print property for an individual physical page that is different from other physical pages in the print job. For example, the user can change the color and/or image quality for the specifically defined physical page within the poster printing application.

SUMMARY OF THE INVENTION

In consideration of the above issues, it would be desirable to have a system and method, which provides a user with the ability to select at least one physical page from a plurality of pages and change at least one print properties on the at least one physical page, which is different than other physical pages within the large format print job.

In accordance with an exemplary embodiment, a method for changing physical page properties in a large format printing application on a client device, comprises: selecting an image for a print job; selecting a logical page size for a printout of the image; dividing the logical page size into a plurality of physical pages based on a selected medium; and selecting at least one physical page from the plurality of physical pages and changing at least one print property on the at least one physical page.

In accordance with another exemplary embodiment, a printing system for changing physical page properties in a large format printing application, comprises: a printer; a client device having executable instructions for creating a print job for producing a printout of an image, comprising: selecting a logical page size for the printout of the image; dividing the logical page size into a plurality of physical pages based on a selected medium; and selecting at least one physical page from the plurality of physical pages and changing at least one print property on the at least one physical page; and wherein the image forming apparatus and the client device are connected.

In accordance with a further exemplary embodiment, a non-transitory computer readable medium containing a computer program for creating a print job, wherein the computer program comprises executable instructions for: selecting an image for a print job; selecting a logical page size for a printout of the image; dividing the logical page size into a plurality of physical pages based on a selected medium; and selecting at least one physical page from the plurality of physical pages and changing at least one print property on the at least one physical page.

In accordance with another exemplary embodiment, a method of combining two or more print images into a large format printout using a poster printing application on a client device and/or image forming apparatus, the executable instructions include the steps of: selecting two or more images for a print job, and wherein each of the two or more images form a logical page; defining for each of the logical pages, which logical pages will be printed in a large print format and which of the logical pages will be printed as a single physical page; dividing the logical pages in which the large print format was selected into a plurality of images or image partitions, wherein each of the image partitions correspond to one physical page; selecting a size for the large format printout is selected for the plurality of logical pages, which includes each of the two or more images; positioning each of the logical pages are within the large format printout; and optionally selecting at least one physical page from one or more of the logical pages and changing at least one print property on the selected at least one physical page.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Large image printing includes in most cases images having a size equal to or greater than a defined paper and/or medium size, and wherein at least one or more sheets of paper and/or medium are needed.

In accordance with an exemplary embodiment, the method and system described herein provides for changing physical page properties in a poster printing application on a client device and/or image forming apparatus. In accordance with an exemplary embodiment, the executable instructions for creating a print job for producing a printout of an image are hosted on a client device and/or an image forming apparatus. The executable instructions include the steps of: selecting the image for the print job; selecting a logical page size for the printout of the image; dividing the logical page size into a plurality of physical pages based on a selected medium; and selecting at least one physical page from the plurality of physical pages and changing at least one print property on the at least one physical page.

Figure 1:
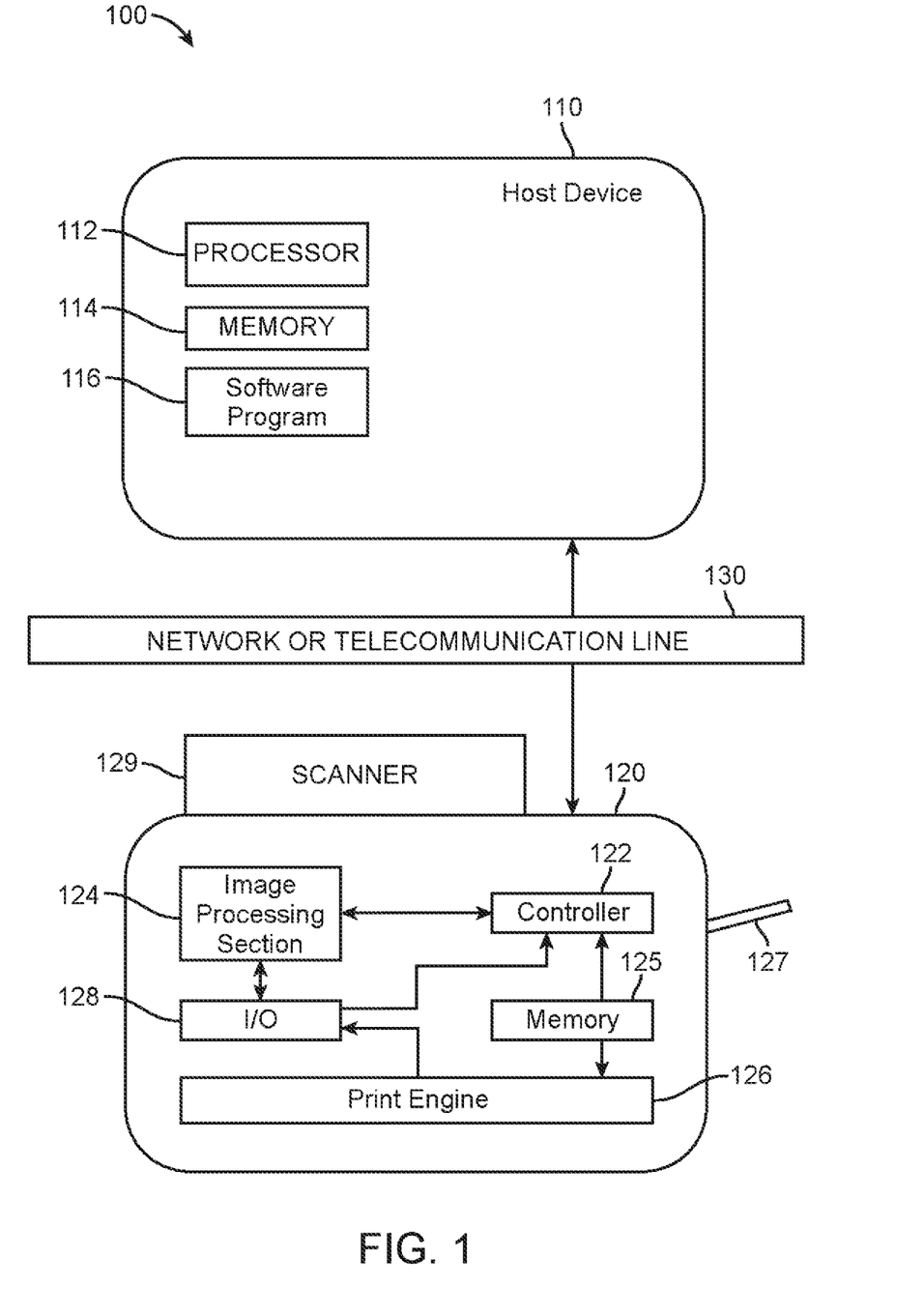
FIG. 1 is an illustration of data processing system, which includes a client device or host computer and an image forming apparatus or printer connected to the client device in accordance with an exemplary embodiment.

FIG. 1 is an illustration of a data processing system 100, which includes a client device or host computer 110 and an image forming apparatus or printer 120 connected to the client device 110. The client device 110 preferably includes a processor or central processing unit (CPU) 112, one or more memories 114 for storing software programs 116 and data (such as files to be printed). The client device 110 also includes an operating system (OS), which manages the computer hardware and provides common services for efficient execution of various software programs 116. The processor or CPU 112 carries out the instructions of a computer program, which operates and/or controls at least a portion of the functionality of the client device 110. Examples of client devices 110 include and are not limited to personal computers, image forming apparatuses, routers, and/or personal digital assistants (PDAs).

The image forming apparatus 120 is preferably in the form of an industrial image forming apparatus, a multi-functional printer, and/or an all-in-one printer 120 connected to the client device 110. The client device 110 submits print jobs to the image forming apparatus (printer or printing device) 120 by transmitting data representing the documents to be printed and information describing the print job. The image forming apparatus (i.e., printer/printing device) 120 typically includes a printer controller (or controller) 122, an image processing section (or data dispatcher) 124, a memory section 125 preferably in the form of a hard disk drive (HDD), a print engine 126, a print tray 127, an input/output (I/O) section 128, and scanner 129.

The controller 122 typically includes a central processing unit (CPU), a random access memory (RAM), and a read only memory (ROM). The central processing unit is configured to execute a sequence of stored instructions (i.e., a computer program). The controller 122 also includes an operating system, which acts as an intermediary between the software programs and hardware components within the image forming apparatus 120. The operating system (or OS) manages the computer hardware and provides common services for efficient execution of application software. In accordance with an exemplary embodiment, the controller 122 processes the data and job information received from the client device 110 to generate a print image.

The image processing section 124 carries out image processing under the control of the controller 122, and sends the processed print image data to the print engine 126. The print engine 126 forms an image on a recording sheet based on the image data sent from the image processing section 124. The I/O section performs data transfer with the host computer 110. The controller 122 is programmed to process data and control various other components of the image forming apparatus or printer 120 to carry out the various methods described herein. The hard disk drive (HDD) or storage device stores digital data and/or software programs for recall by the controller 122. In accordance with an exemplary embodiment, the digital data includes resources, which can include graphics/images, logos, form overlays, fonts, etc.

The input/output (I/O) port 128 provides communications between the printer section and the client device 110 and receives page descriptions (or print data) from the host for processing within the image forming apparatus 120. In accordance with an exemplary embodiment, the operation of printer section commences when it receives a page description from the client device 110 via I/O port 128 in the form of a print job data stream. The page description may be any kind of page description languages (PDLs), such as PostScript® (PS), Printer Control Language (PCL), Portable Document Format (PDF), XML Paper Specification (XPS), and so on. Examples of image forming apparatuses 120 consistent with exemplary embodiments of the invention include industrial printers, and/or multi-function printers or peripherals (MFP).

The client device 110 and the image forming apparatus (or printer) 120 are preferably connected to one another via a network 130. Examples of the network 130 consistent with embodiments of the invention include, but are not limited to, the Internet, an intranet, a local area network (LAN) and a wide area network (WAN). The client device 110 and the image forming apparatus 120 can also be connected with a wire and/or wireless technology by using radio frequency (RF) and/or infrared (IR) transmission.

Figure 2:
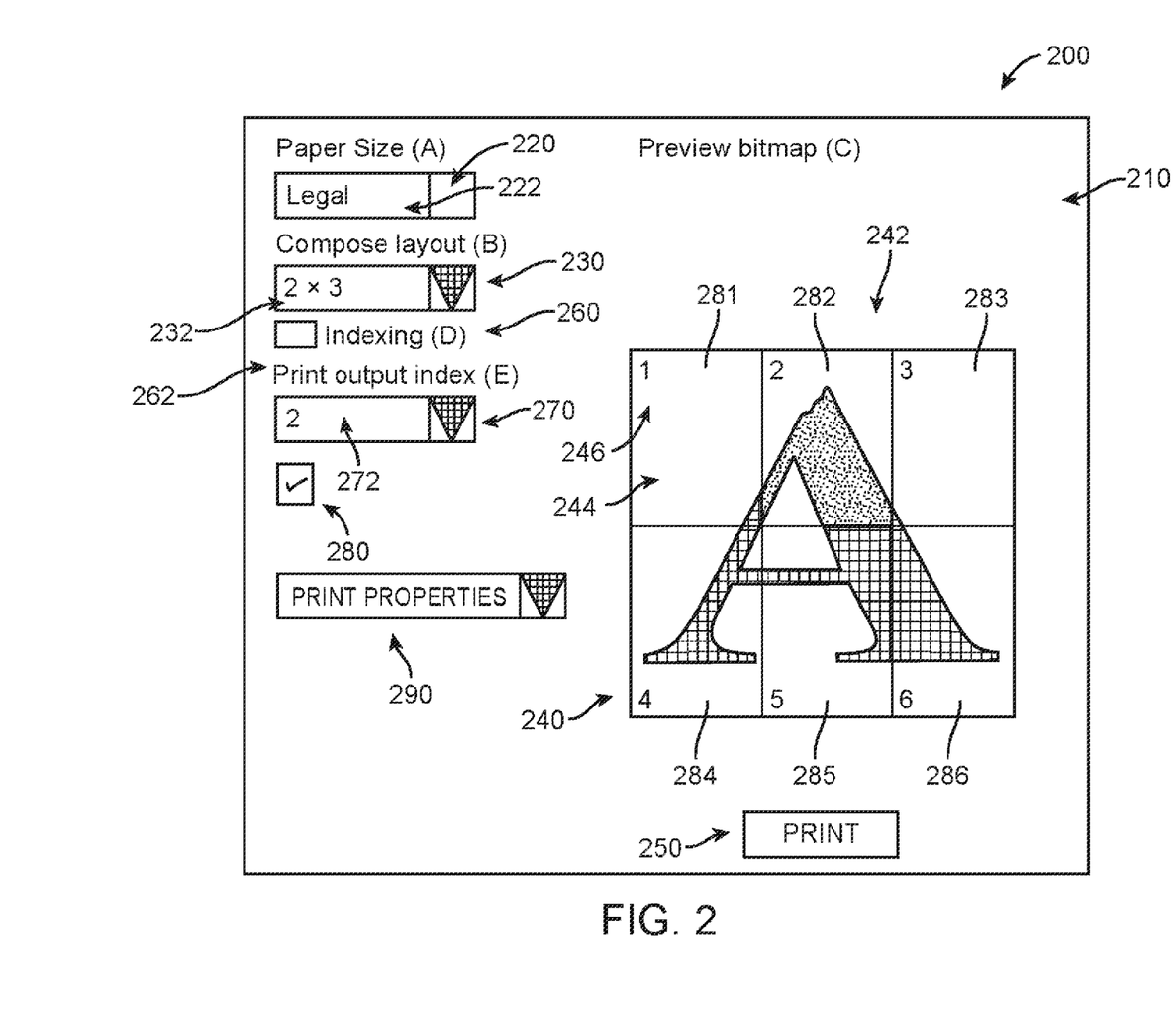
FIG. 2 is an illustration of a driver user interface associated with a client device or host computer in accordance with an embodiment.

FIG. 2 is an illustration of a printer driver user interface 200 associated with a client device or host computer 100 in accordance with an embodiment. As shown in FIG. 2, in accordance with an embodiment, the driver user interface 200 includes a graphical user interface (GUI) screen 210 having a paper size window 220, a compose layout window 230, a display (or display window) 240 in the form of a preview bitmap 242, and a print button 250. The graphical user interface (GUI) screen 210 enables a user to configure print settings for the image forming apparatus 120. The user interacts with the interface 210 to configure the printer driver, and thereby specify print settings for any print jobs sent from the client device 110 to the image forming apparatus 120. For example, the client device 110 may provide one or more graphical user interface (GUI) screens, which allows the user to specify print settings such as, paper type, paper source, pages to be printed, number of copies to print, print quality, print sizing/scaling, double-sided printing, N-up printing, collating, color printing, print order, and the like. Further, the user may set the print settings, at least in part, through interaction with graphical elements of the interface 200 (e.g., pushing buttons, selecting menu items, selecting radio buttons, clicking icons, checking boxes, etc.).

In accordance with an embodiment, the driver user interface screen 210 displays at least one paper size option 222 within the paper size window 220, a compose layout (or composition layout) 232 in form of matrix, which indicates how the image partitions or physical pages will print according to the size of the selected medium (or paper) and as displayed in the preview bitmap 242. The preview bitmap 242 preferably displays a plurality of rectangular partitions, which illustrate how the large print image or logical page is partitioned upon a selection of a particular paper size. The compose layout window 230 has a set of layouts 232 (or matrixes, such as 1×1, 1×2, 1×3, 2×1, 2×2, 2×3, 3×1, 3×2, and 3×3) using a roll down cursor window, or user option windows to enter custom number of rows and columns to be printed.

As shown in FIG. 2, the driver user interface 200 also includes an indexing window 260, a print output index window 270, a print property window 280, and a listing of print property window or tab 290. The index printing application provides the user the ability to selectively print individual sheets of the image (or poster). The indexing window 260 includes a check box 262, which controls the on/off function of the index printing. In accordance with an exemplary embodiment, the print output index window 270 includes a numeric script number (and/or symbol) 272, which corresponds to a numeric script number 246 on each of the physical pages (or partitions) 244 of the bitmap 242, and which is based on the layout matrix chosen in the compose layout window 230. The numeric script number (and/or symbol) 272 can be a numeric number, alphabetic letters, a combination thereof, or any other system in which the corresponding partitions 244 on the bitmap 242 can be identified.

The print property window 280 provides the user with the ability to selectively change at least one print property within one or more of the physical pages of the image. The listing of print property window 290 is preferably a pull down window or click-through tab, which provides a link to one or more available print properties, which relate to color and/or image quality of the printed image. In accordance with an embodiment, if a user wishes to change at least one print property, the user checks the print property window 280, and selects a physical page or partition 244 on the display and a corresponding print property via the listing of print property window or tab 290. Once the corresponding print property has been selected, the user can print the plurality of pages, which form the logical page or poster printout. In accordance with an alternative embodiment, the listing of print properties 290 can be a separate user interface screen, which is not associated with the selection of the compose layout window as shown in FIG. 2. For example, one or more separate user interface screens can be used to specify print settings such as, paper type, paper source, pages to be printed, number of copies to print, print quality, print sizing/scaling, N-up printing, color printing, print order, and the like.

In accordance with an exemplary embodiment, the paper size window 220, the compose layout window (or composition layout window) 230, the print button 250, indexing window 260, the print output index window 270, the print property window 280, and the listing of print property window or tab 290 are preferably controlled through the use of cursor via a mouse and/or keyboard. Alternatively, the paper size window 220, the compose layout window (or composition layout window) 230, the print button 250, the indexing window 260, the print output index window 270, the print property window 280, and the listing of print property window or tab 290 can be controlled via a touch screen technology, which can detect the presence and location of a touch within the display area to change the paper size, change the layout of the image, change print properties, and to initiate and/or start the printing process.

In accordance with an embodiment, a positioning index can be printed on each sheet to assist in the assembling process. Sometimes it may be difficult for the user to determine which printed sheet should be placed at which position when assembling the poster. A small positioning index, such as a pair of column and row numbers, can be printed in the overprinted area of each sheet, such as near a corner, to help the user identify the sheet during assembly. The position index should be printed in an area that will either be torn off or in an area that will be covered by a neighboring sheet.

Figure 3:
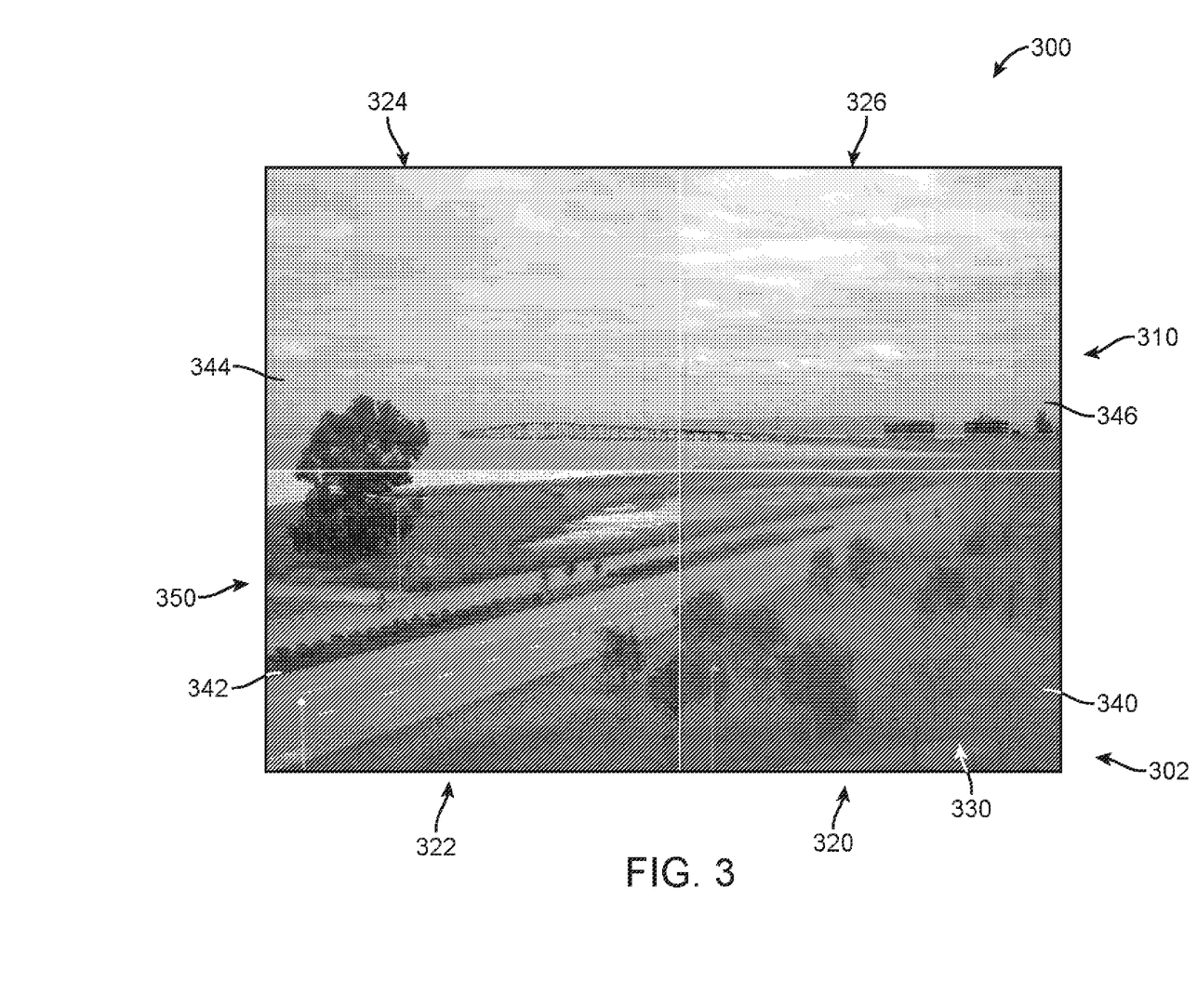
FIG. 3 is an illustration of a large format printout or poster page from a poster printing application where an individual physical page has different print properties than the other physical pages in the print job.

FIG. 3 is an illustration of a large format print or poster page 300 from a poster printing application where an individual physical page 320 has different print properties than the other physical pages 322, 324, 326 in the print job. The large format printout or poster page 300 of the print image 302 is formed from a logical page 310, which is created by manually joining several physical pages 320, 322, 324, 326 together to make one large format printout or poster page 300. Typically, a single page in an original document can be said to be one logical page 310. However, multiple physical pages 320, 322, 324, 326 can represent the single logical page 310 when the logical page 310 is printed in the large format or poster printing mode. In the large format or poster printing mode, each physical page 320, 322, 324, 326 is an actual physical sheet of paper (i.e., print medium) that is used to print a poster print job. As set forth above, posters 300 are generally printed on large format papers and require sophisticated, large printers to print. However, small printers, e.g., printers typically used in homes or business offices, are typically limited to letter, legal, A4 and A3 sizes papers and cannot handle larger sized papers. To enable printing of a large format poster using a small printer in an inexpensive manner, some printer drivers or application software provide a poster printing function, which divides the large poster image 330 into smaller image sections 340, 342, 344, 346, typically rectangular in shape.

In accordance with an exemplary embodiment, each of the image sections 340, 342, 344, 346 are printed separately on individual sheets of paper or print medium 320, 322, 324, 326, and assembled together to form a large format poster 300. For example, in a 2×2 poster printing application, the logical page 310 will have four (4) physical sheets 320, 322, 324, 326, which make up the one (1) logical page 310. In printing an image 330 in a poster printing application, as shown in FIG. 3, the user selects the logical page size 310 (or matrix) via the compose layout window 230 on the display and/or graphical user interface (GUI) screen 210. A poster 300 sized at 17 by 22 inches can be made from four 8.5 by 11 pages (or sheets of print medium) 320, 322, 324, 326, which is a 2×2 application (or 2×2 matrix). In a poster printing application, the user is able to define the following settings: number of rows (X) and columns (Y), output paper size, and orientation (e.g., portrait or landscape). In addition, each physical page 320, 322, 324, 326 of the print job, which forms the logical page size 310, is printed with the same print properties 350.

The executable instructions provide for the selection of a logical page size 310 for the printout of the image based on the selection of a composite matrix via the compose layout window 230 on the display and/or graphical user interface (GUI) screen 210. The logical page size 310 is then divided into a plurality of physical pages 320, 322, 324, 326 based on a selected medium. At least one physical page 320 from the plurality of physical pages 320, 322, 324, 326 is selected and at least one print property 350 is changed on the at least one physical page 320, which has been selected from the plurality of physical pages 320, 322, 324, 326. The at least one print property 350 preferably relates to color and/or image quality of the print image. For example, the image quality can include brightness, edge effect, sharpening or hardening, smoothness, shadowing, shading and/or blurring of the background. Alternatively, each of the plurality of physical pages 320, 322, 324, 326 can have a unique color and/or color property or variation. For example, one physical page 320 could be black and white, and the other physical pages 322, 324, 326 could have a color or colorant. In accordance with another exemplary embodiment, two or more print properties 350 on the selected physical sheet 320 can be changed as desired by the user. In addition, rather than selecting only one physical page or sheet 320 of the plurality of physical pages or sheets 320, 322, 324, 326 of the printout, the user can select two or more physical pages or sheets 320, 322, wherein at least one print property 350 is changed.

The step of dividing the logical page size into a plurality of physical pages comprises dividing the print image into a plurality of physical pages, which are in arranged in rows (X) and columns (Y), which forms the selected compose layout or matrix. The selected medium has a sheet size, which can include letter (8.5 by 11 inches), legal (8.5 by 14 inches), A4 and A3 sizes papers, and/or any other desirable sheet size for the printed medium. The step of selecting the logical page size for the printout of the image further comprises selecting an orientation (e.g., landscape or portrait) of the print image on the logical page size.

The at least one physical page has at least one print property 350 that is different from each of the other physical pages in the print job. In accordance with an exemplary embodiment, the at least one print property 350 is color and/or image quality. The image qualities of a print image are measures of the characteristics of the perceived image degradation as compared to an ideal or perfect image. For example, image quality of a print image, such as a photograph, can include sharpness, brightness, noise, dynamic range, tone reproduction, contrast, color accuracy, distortion, and exposure accuracy.

In accordance with an exemplary embodiment, the method further includes displaying the print image within the logical page size on a display 210 (e.g., graphical user interface), which displays the print image based on the selected medium, and allows a user to select the at least one physical page from the plurality of physical pages and adjust/change the at least one print property on the at least one physical page. In accordance with an exemplary embodiment, the print image is displayed as a bitmap or pixmap 240. Once the image forming apparatus 120 has generated and/or received the print job, the image forming apparatus 120 prints the plurality of physical pages 320, 322, 324, 326. As shown in FIG. 3, the plurality of physical pages 320, 322, 324, 326 are then assembled into a poster page (i.e., logical page 310).

Figure 4:
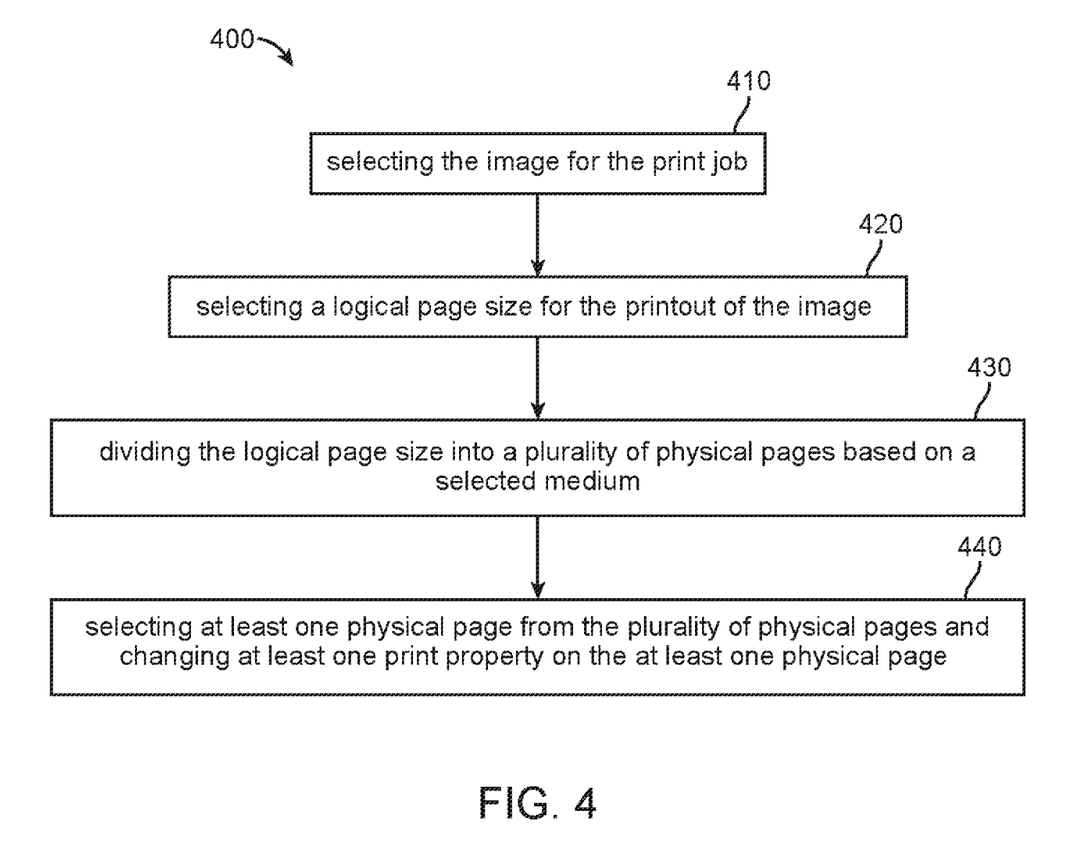
FIG. 4 is a flow chart illustrating a method for changing physical page properties in a poster printing application on an image forming apparatus in accordance with an exemplary embodiment.

FIG. 4 is an illustration of a method for changing physical page properties in a poster printing application on an image forming apparatus in accordance with an exemplary embodiment. As shown in FIG. 4, the method for changing physical page properties in a large format printing application has executable instructions 400 for creating a print job for producing a printout of an image. In step 410, the image for the print job is selected. In step 420, a logical page size is selected for the printout of the image. In step 430, the logical page size is divided into a plurality of physical pages based on a selected medium. In step 440, at least one physical page from the plurality of physical pages is selected and at least one print property is changed on the at least one physical page.

Figure 5:
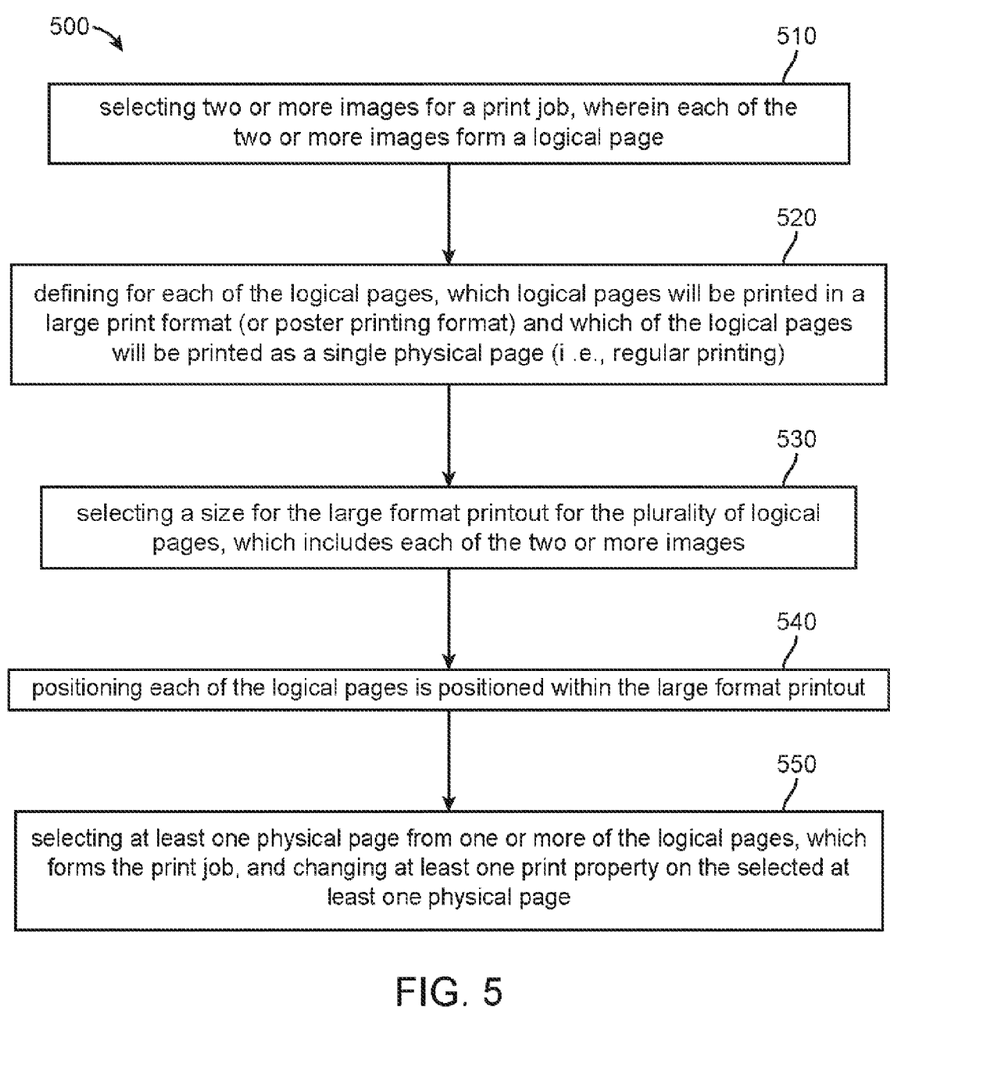
FIG. 5 is an illustration of a method of combining two or more print images into a poster printing application in accordance with an exemplary embodiment.

FIG. 5 is an illustration of another exemplary embodiment, which include executable instructions 500 for combining two or more print images into a large format printout using a poster printing application on a client device and/or image forming apparatus. As shown in FIG. 5, the executable instructions 500 include in step 510, selecting two or more images for a print job, wherein each of the two or more images form a logical page. In step 520, the user defines for each of the logical pages, which logical pages will be printed in a large print format (or poster printing format) and which of the logical pages will be printed as a single physical page (i.e., regular printing). For each logical page in which the large format printing application or poster printing application has been selected, the logical page will be divided into a plurality of images or image partitions, which each correspond to one physical page or sheet. In step 530, a size for the large format printout is selected for the plurality of logical pages, which includes each of the two or more images. In step 540, each of the logical pages is positioned within the large format printout. In an optional step 550, the user can select at least one physical page from one or more of the logical pages, which forms the print job, and changing at least one print property on the selected at least one physical page. The at least one print property is preferably color and/or image quality of the printed logical pages.

Figure 6:
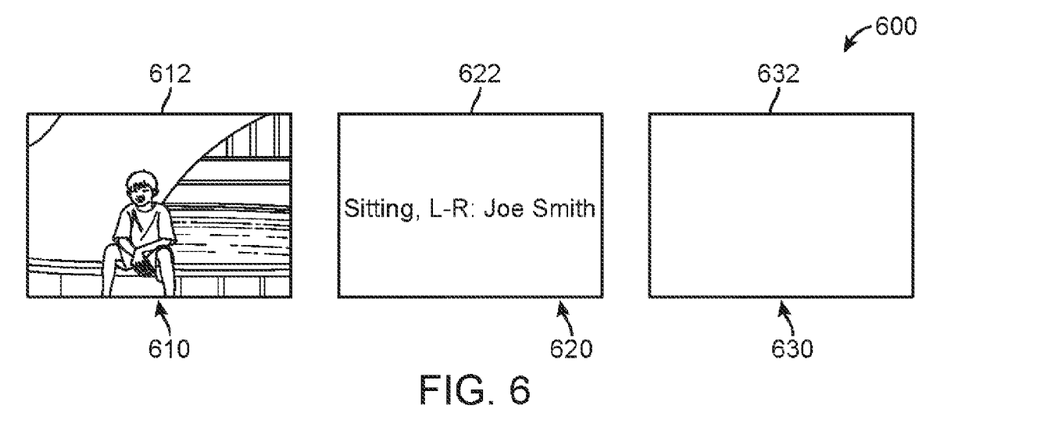
FIG. 6 is an illustration of a poster printing application in which two or more print images are combined and/or integrated into one logical page having a plurality of physical pages in accordance with an exemplary embodiment.

FIG. 6 is an illustration of a method of combining two or more print images into a poster printing application 600 in accordance with an exemplary embodiment. As shown in FIG. 6, the user selects two or more print images 610, 620, 630, which form a first logical page 612, a second logical page 622, and a third logical page 632. In accordance with an exemplary embodiment, each of the first, second, and third logical pages 612, 622, 632 are comprised of one or more physical pages when assembled in a large format printing application or mode. The selected two or more print images can include text, images (e.g., a reproduction or imitation of the form of a person or thing), and/or pages containing neither text and/or images.

Figure 7:
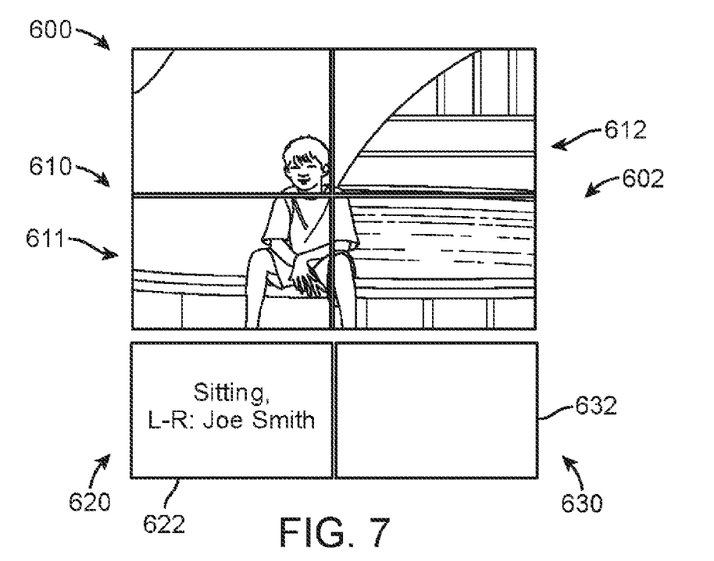
FIG. 7 is an illustration of a method of combining two or more print images into a poster printing application in accordance with another exemplary embodiment.

FIG. 7 is an illustration of a poster printing application 600 in which the two or more print images 610, 620, 630 are combined and/or integrated into one large format printout 602 having a plurality of physical pages in accordance with an exemplary embodiment. In accordance with an exemplary embodiment, the printer driver on the client device and/or software application within the image forming apparatus is set to a large format print or poster printing application. The user is then selects a desired matrix (e.g., number of columns and rows for the large format print out). For example, as shown in FIG. 7, a large formal print out comprising 6 physical pages arranged in 2 columns of 3 sheets of print medium (2×3 matrixes) was selected from a graphical user interface or display as shown in FIG. 2. The first logical page 612, which includes a first image 611 is designated to be printed on 4 physical pages in a 2×2 matrix (2 columns of 2 rows). The second and third logical pages 622, 632 are each identified and designated to be printed as a single physical page (or regular printing). The plurality of physical pages are printed by the image forming apparatus and assembled into a large format printout or poster page.

In accordance with an exemplary embodiment, in the client device and/or image forming apparatus, the printer driver includes a display (or graphical user interface), which displays the print image within the logical page size, which allows the user to select which images are placed in each of the relative columns and rows as selected for the large print format or poster printing application. In addition, as described above, the user can select one or more of the physical pages from the plurality of physical pages and change at least one print property on the at least one physical page.

Figure 8:
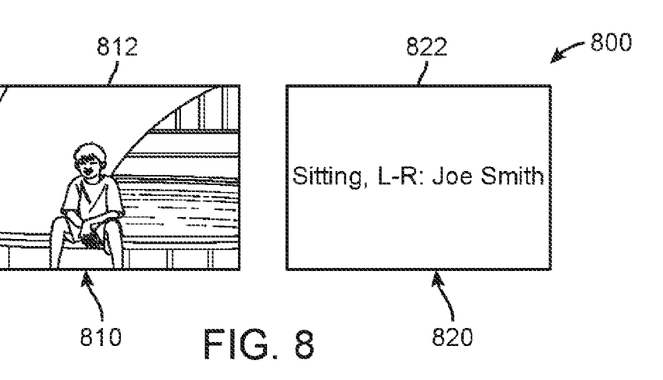
FIG. 8 is an illustration of a poster printing application in which two or more print images are combined and/or integrated into one logical page having a plurality of physical pages in accordance with an exemplary embodiment.

FIG. 8 is an illustration of a method of combining two or more print images into a poster printing application 800 in accordance with another exemplary embodiment. As shown in FIG. 8, the user selects two or more print images 810, 820, which form a first logical page 812 and a second logical page 822, respectively. In accordance with an exemplary embodiment, each of the first and second logical pages 812, 822 are comprised of a plurality of physical pages in a large format printing application or a single physical page in a regular printing mode.

Figure 9:
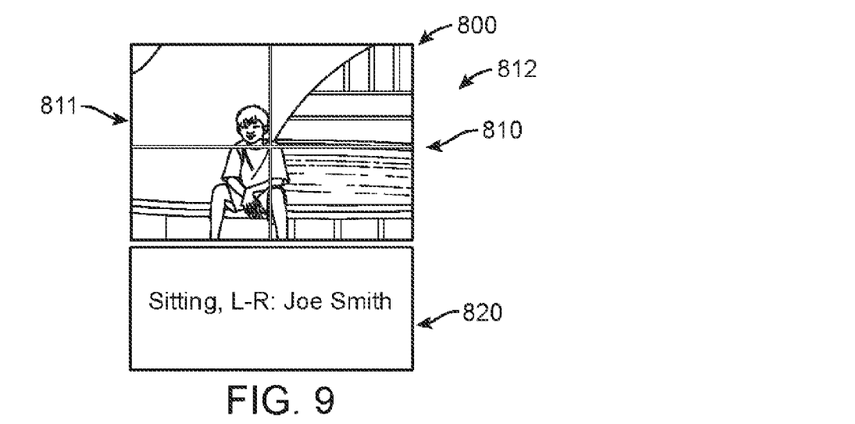
FIG. 9 is an illustration of a method of combining two or more print images into a poster printing application in accordance with an exemplary embodiment.

FIG. 9 is an illustration of a poster printing application 800 in which two or more print images 810, 820 are combined and/or integrated into one large format printout 802 having a plurality of physical pages in accordance with an exemplary embodiment. As shown in FIG. 9, the first print image 810 forms the first logical page 812, which includes a first image 811, which is designated to be printed on 4 physical pages in a 2×2 matrix (2 columns of 2 rows). The second logical page 822 is designated to be printed as a single physical page, which is positioned below the first image 811. As shown in FIG. 9, the second logical page 822 is printed on a larger sheet of paper or medium than the first logical page 812, which is printed on 4 sheets of a smaller size of paper or medium.

Figure 10:
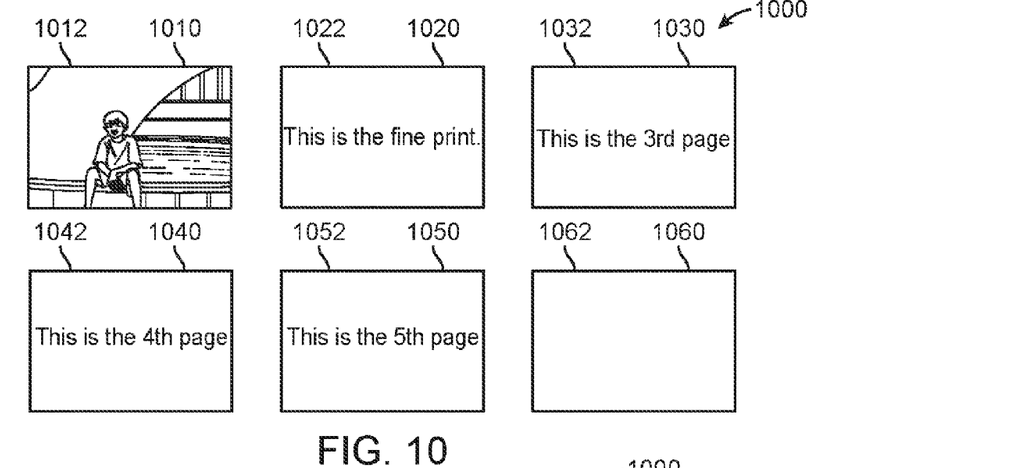
FIG. 10 is an illustration of a poster printing application in which two or more print images are combined and/or integrated into one logical page having a plurality of physical pages in accordance with an exemplary embodiment.

FIG. 10 is an illustration of a method of combining two or more print images into a poster printing application 1000 in accordance with an exemplary embodiment. As shown in FIG. 10, the user selects two or more print images 1010, 1020, 1030, 1040, 1050, 1060, which form a first logical page 1012, a second logical page 1022, a third logical page 1032, a fourth logical page 1042, a fifth logical page 1052, and a sixth logical page 1062, respectively. In accordance with an exemplary embodiment, each of the first, second, third, fourth, fifth and sixth logical pages 1012, 1022, 1032, 1042, 1052, 1062 are comprised of a plurality of physical pages in a large format printing application, a single physical page in regular printing mode, or combined into one physical page in a N-up printing application.

Figure 11:
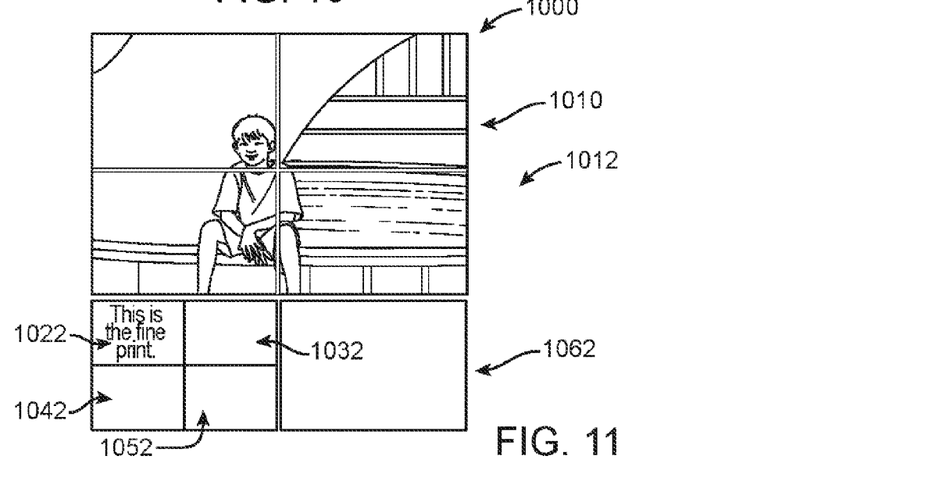
FIG. 11 is an illustration of a method of combining two or more print images into a poster printing application in accordance with another exemplary embodiment.

FIG. 11 is an illustration of a poster printing application 1000 in which two or more print images are combined and/or integrated into one logical page having a plurality of physical pages in accordance with an exemplary embodiment. As shown in FIG. 11, the first print image 1010 forms the first logical page 1012, which includes a first image 1011 that is designated to be printed on 4 physical pages in a 2×2 matrix (2 columns of 2 rows). The second, third, fourth, and fifth logical pages 1022, 1032, 1042, 1052, are each designated to be printed as a single physical page, which are positioned below the first image 1011. The printing of the second, third, fourth and fifth logical pages 1022, 1032, 1042, 1052 are in an N-up printing application inside the large print or poster print format application. N-up printing is the printing of a plurality of print images on a single sheet of paper (e.g., physical page). As shown in FIG. 11, the sixth logical page 1062 is printed on a single sheet of paper (i.e., one physical page).

Figure 12:
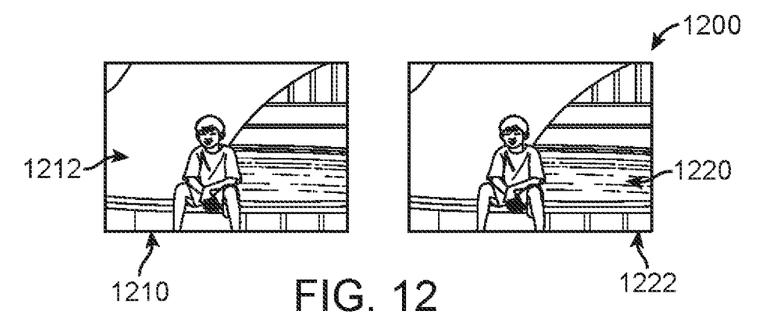
FIG. 12 is an illustration of a poster printing application in which two or more print images are combined and/or integrated into one logical page having a plurality of physical pages in accordance with an exemplary embodiment.

FIG. 12 is an illustration of a method of combining two or more print images into a poster printing application 1200 in accordance with an exemplary embodiment. As shown in FIG. 12, the user selects two or more print images 1210, 1220, which form a first logical page 1212 and a second logical page 1222. In accordance with an exemplary embodiment, each of the first and second logical pages 1212, 1222 are comprised of one or more physical pages in a large format printing application or mode.

Figure 13:
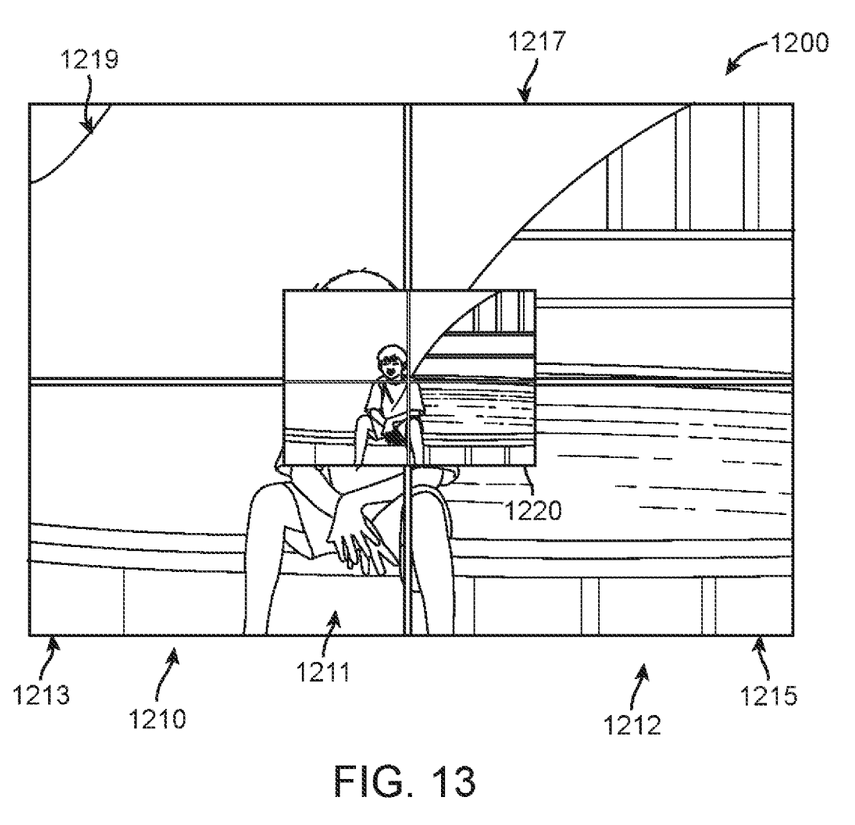
FIG. 13 is an illustration of a poster printing application in which two or more print images are combined and/or integrated into one logical page having a plurality of physical pages in accordance with a further exemplary embodiment.

FIG. 13 is an illustration of a poster printing application 1200 in which two or more print images are combined and/or integrated into one logical printout page having a plurality of physical pages in accordance with an exemplary embodiment. As shown in FIG. 13, the first print image 1210 forms the first logical page 1212, which includes a first image 1211 that is designated to be printed on 4 physical pages 1213, 1215, 1217, 1219 in a 2×2 matrix (2 columns of 2 rows). In addition, the second print image 1220 is nested within each of the 4 physical pages 1213, 1215, 1217, 1219. As shown, the second print image 1220 is centered within the first print image 1211. Thus, a portion of the second print image 1220 is printed in a lower left corner, a lower right corner, an upper right corner and an upper left corner of the 4 physical pages 1213, 1215, 1217, 1219.

Figure 14:
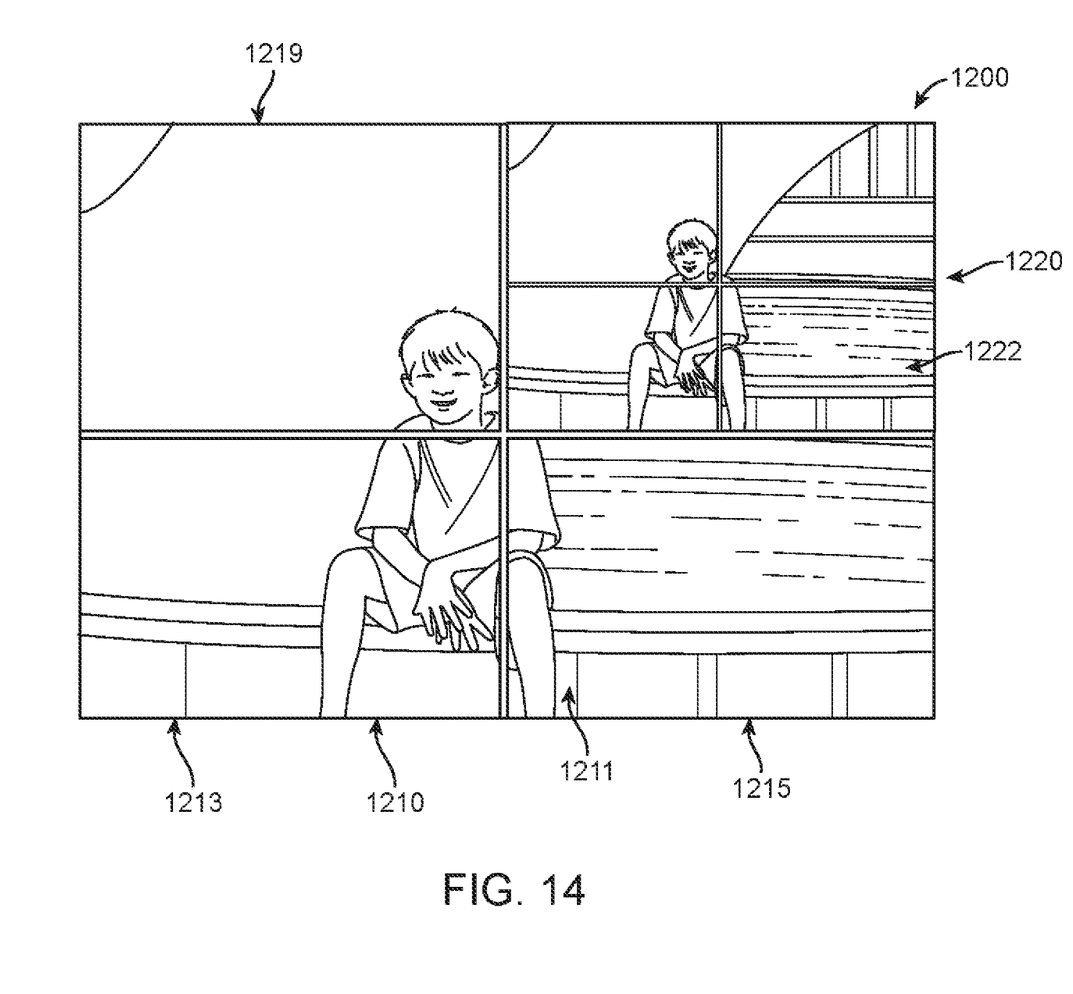
FIG. 14 is an illustration of a poster printing application in which two or more print images are combined and/or integrated into one logical page having a plurality of physical pages in accordance with a further exemplary embodiment.

FIG. 14 is an illustration of a poster printing application 1200 in which two or more print images are combined and/or integrated into one logical page having a plurality of physical pages in accordance with an exemplary embodiment. As shown in FIG. 14, the first print image 1210 forms the first logical page 1212, which includes a first image 1211 that is designated to be printed on 4 physical pages 1213, 1215, 1217, 1219 in a 2×2 matrix (2 columns of 2 rows). In addition, the second print image 1220 is nested within one of the four physical pages 1215. In accordance with an exemplary embodiment, the user can select any of the four physical pages 1213, 1215, 1217, 1219 to position the respective second image 1220. Each of the four physical sheets 1213, 1215, 1217, 1219 can be printed on the same and/or different mediums (e.g., glossy paper versus non-glossy paper). In addition, the print attributes can be changed on one or more of the sheets 1213, 1215, 1217, 1219. For example, one sheet can be printed in color with the other 3 sheets printed in black and white.

In accordance with another exemplary embodiment, a non-transitory computer readable medium containing a computer program for creating a print job, wherein the computer program comprises executable instructions for: selecting an image for a print job; selecting a logical page size for a printout of the image; dividing the logical page size into a plurality of physical pages based on a selected medium;

selecting at least one physical page from the plurality of physical pages and changing at least one print property on the at least one physical page.

In accordance with a further exemplary embodiment, a non-transitory computer readable medium containing a computer program for creating a print job, wherein the computer program comprises executable instructions for: selecting two or more images for a print job, and wherein each of the two or more images form a logical page; defining for each of the logical pages, which logical pages will be printed in a large print format and which of the logical pages will be printed as a single physical page; dividing the logical pages in which the large print format was selected into a plurality of images or image partitions, wherein each of the image partitions correspond to one physical page; selecting a size for the large format printout is selected for the plurality of logical pages, which includes each of the two or more images; positioning each of the logical pages are within the large format printout; and optionally selecting at least one physical page from one or more of the logical pages and changing at least one print property on the selected at least one physical page.

The non-transitory computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

The methods as described herein may be implemented by software as a part of a printer driver or a part of an application program that handles images. The invention is directed to both the method and an apparatus, such as an image forming apparatus (or printer) 120 or computer device (or host computer) 110, which implements the method by executing a program stored in a non-volatile memory, such as a read only memory (ROM). The method may be introduced into the image forming apparatus 120 or computer device 110 by updating the firmware in the non-volatile memory. In this regard, the method may be brought to the apparatus 120 or computer device 110 in a form of a package of install software and the firmware, which may be divided and/or compressed so that the install software effectively installs the firmware. The package may be steadily stored in a computer readable diskette, such as a compact disk, or may be transmitted through a wire/wireless communication line.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for changing physical page properties in a large format printing application on a client device having a graphical user interface, the client device having executable instructions for creating a print job for producing a printout of an image, the method comprising:
   selecting the image for the print job;
   selecting a logical page size for the printout of the image on the graphical user interface;
   selecting a medium on the graphical user interface and dividing the logical page size into a plurality of physical pages based on the selected medium;
   generating a bitmap of the plurality of physical pages based on the selected medium, and displaying the bitmap of the plurality of physical pages on the graphical user interface; and
   selecting at least one physical page from the bitmap of the plurality of physical pages using the graphical user interface and changing at least one print property on the at least one physical page, wherein the graphical user interface includes a selector for selecting the at least one physical page from the plurality of physical pages, and a print property change window for selectively changing the at least one print property on the at least one physical page, and wherein for each of the plurality of physical pages not selected from the plurality of physical pages, the at least one print property does not change.

2. The method of claim 1, wherein the client device is connected to an image forming apparatus, and wherein the client device has executable instructions for creating the print job, and sending the print job to the image forming apparatus.

3. The method of claim 1, comprising:
   printing the plurality of physical pages; and assembling the plurality of physical pages into a poster page.

4. The method of claim 1, wherein the step of dividing the logical page size into a plurality of physical pages comprises dividing the print image into the plurality of physical pages, which are in arranged in rows and columns.

5. The method of claim 1, wherein the selected medium has a sheet size.

6. The method of claim 1, wherein the step of selecting the logical page size for the printout of the image further comprises selecting an orientation of the print image within the logical page size.

7. The method of claim 1, wherein the at least one physical page has at least one print property that is different from each of the other physical pages in the print job.

8. The method of claim 7, wherein the at least one print property is color and/or image quality.

9. The method of claim 1, wherein the client device is an image forming apparatus having the graphical user interface.

10. A printing system for changing physical page properties in a large format printing application, comprising:
    an image forming apparatus; and
    a client device having a graphical user interface, the client device having executable instructions for creating a print job for producing a printout of an image, comprising:
      selecting the image for the print job;
      selecting a logical page size for the printout of the image on the graphical user interface;
      selecting a medium on the graphical user interface and dividing the logical page size into a plurality of physical pages based on the selected medium;
      generating a bitmap of the plurality of physical pages based on the selected medium, and displaying the bitmap of the plurality of physical pages on the graphical user interface; and
      selecting at least one physical page from the bitmap of the plurality of physical pages using the graphical user interface and changing at least one print property on the at least one physical page, wherein the graphical user interface includes a selector for selecting the at least one physical page from the plurality of physical pages, and a print property change window for selectively changing the at least one print property on the at least one physical page, and wherein for each of the plurality of physical pages not selected from the plurality of physical pages, the at least one print property does not change; and wherein the image forming apparatus and the client device are connected.

11. The system of claim 10, comprising:
assembling the plurality of physical pages into a poster page.

12. The system of claim 10, wherein the step of dividing the logical page size into a plurality of physical pages comprises dividing the print image into the plurality of physical pages, which are in arranged in rows and columns.

13. The system of claim 10, further comprising selecting a sheet size for the medium.

14. The system of claim 10, comprising:
selecting an orientation of the print image within the logical page size.

15. The system of claim 10, wherein the at least one physical page has at least one print property that is different from each of the other physical pages in the print job.

16. The system of claim 15, wherein the at least one physical property is color and/or image quality.

17. A non-transitory computer readable medium containing a computer program for creating a print job, wherein the computer program comprises executable instructions for:
selecting an image for the print job;
selecting a logical page size for the printout of the image on the graphical user interface;
selecting a medium on the graphical user interface and dividing the logical page size into a plurality of physical pages based on the selected medium;
generating a bitmap of the plurality of physical pages based on the selected medium, and displaying the bitmap of the plurality of physical pages on the graphical user interface; and
selecting at least one physical page from the bitmap of the plurality of physical pages using the graphical user interface and changing at least one print property on the at least one physical page, wherein the graphical user interface includes a selector for selecting the at least one physical page from the plurality of physical pages, and a print property change window for selectively changing the at least one print property on the at least one physical page, and wherein for each of the plurality of physical pages not selected from the plurality of physical pages, the at least one print property does not change.

18. The computer readable medium of claim 17, wherein the step of selecting the logical page size for the printout of the image further comprises selecting an orientation of the print image within the logical page size.

* * * * *